United States Patent
Sambhar

(10) Patent No.: US 11,853,920 B2
(45) Date of Patent: Dec. 26, 2023

(54) METHODS AND SYSTEMS FOR IMPLEMENTING HIERARCHY OF RULE-BASED SECURITY AUTHENTICATION MODES

(71) Applicant: JPMorgan Chase Bank, N.A., New York, NY (US)

(72) Inventor: Ankur Sambhar, Thane West (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 323 days.

(21) Appl. No.: 16/669,972

(22) Filed: Oct. 31, 2019

(65) Prior Publication Data

US 2020/0134623 A1    Apr. 30, 2020

Related U.S. Application Data

(60) Provisional application No. 62/753,294, filed on Oct. 31, 2018.

(51) Int. Cl.
*G06Q 20/40* (2012.01)
*G06Q 20/34* (2012.01)

(52) U.S. Cl.
CPC ........... *G06Q 20/405* (2013.01); *G06Q 20/34* (2013.01); *G06Q 20/409* (2013.01)

(58) Field of Classification Search
CPC .... G06Q 20/405; G06Q 20/34; G06Q 20/409; G06Q 20/4014
See application file for complete search history.

(56) References Cited

U.S. PATENT DOCUMENTS

| 8,745,698 | B1 * | 6/2014 | Ashfield | ................ H04L 63/08 726/4 |
| 10,755,281 | B1 * | 8/2020 | Yip | .................... G06Q 20/4016 |
| 2006/0156385 | A1 * | 7/2006 | Chiviendacz | ......... H04L 9/3271 726/2 |

(Continued)

FOREIGN PATENT DOCUMENTS

| WO | WO-03069821 A1 * | 8/2003 | ............. G06Q 10/10 |
| WO | WO-2013049359 A1 * | 4/2013 | ........... G06Q 20/027 |
| WO | WO-2014011691 A1 * | 1/2014 | ........... G06Q 20/326 |

OTHER PUBLICATIONS

Leskovec, Jure, Anand Rajaraman, and Jeffrey David Ullman. "Mining of Massive Datasets." (2014). (Year: 2014).*

(Continued)

*Primary Examiner* — Scott C Anderson
*Assistant Examiner* — James H Miller
(74) *Attorney, Agent, or Firm* — Greenblum & Bernstein, P.L.C.

(57) ABSTRACT

The invention relates to implementing rules based authentication for credit card transactions. The system and method may involve: receiving a transaction request associated with a card product from a user at a point of sale system; determining an authorization mode for the transaction request based on one or more transaction attributes; executing an authentication rule for the transaction request; transmitting an authentication request via the authorization mode based on the authentication rule; requiring an authorization input from the user responsive to the authentication request; and upon receiving a proper authentication input, verifying the user and proceeding with the transaction request.

20 Claims, 2 Drawing Sheets

(56) References Cited

U.S. PATENT DOCUMENTS

| | | | | |
|---|---|---|---|---|
| 2013/0024364 | A1* | 1/2013 | Shrivastava | G06Q 20/12 |
| | | | | 705/39 |
| 2013/0144785 | A1* | 6/2013 | Karpenko | G06Q 20/425 |
| | | | | 705/44 |
| 2013/0218765 | A1* | 8/2013 | Hammad | G06Q 20/326 |
| | | | | 705/41 |
| 2013/0293363 | A1* | 11/2013 | Plymouth | H04L 63/1425 |
| | | | | 340/309.16 |
| 2014/0351140 | A1* | 11/2014 | Webb | G06F 21/33 |
| | | | | 705/44 |
| 2015/0052587 | A1* | 2/2015 | O'Neill | G06F 21/33 |
| | | | | 726/4 |
| 2015/0227730 | A1* | 8/2015 | Grigg | H04L 63/10 |
| | | | | 726/7 |
| 2017/0006042 | A1* | 1/2017 | Hardt | H04L 63/105 |
| 2018/0053185 | A1* | 2/2018 | Kohli | G06Q 30/0613 |
| 2018/0293579 | A1* | 10/2018 | Tetali | G06Q 20/3674 |
| 2019/0114404 | A1* | 4/2019 | Nowak | H04W 12/06 |
| 2019/0260742 | A1* | 8/2019 | Arora | G06N 3/08 |
| 2020/0134623 | A1* | 4/2020 | Sambhar | G06Q 20/409 |

OTHER PUBLICATIONS https://www.irs.gov/pub/irs-pdf/f8300.pdf (Rev. Aug. 2014) (Year: 2014).*

Credit Card Fraud Detection at Merchant Side using Neural Networks (Year: 2016).*

Understanding the differences between AI, machine learning, and deep learning (Year: 2017).*

* cited by examiner

METHODS AND SYSTEMS FOR IMPLEMENTING HIERARCHY OF RULE-BASED SECURITY AUTHENTICATION MODES

CROSS REFERENCE TO RELATED APPLICATIONS

The application claims priority to U.S. Provisional Application 62/753,294, filed Oct. 31, 2018, the contents of which are incorporated herein in its entirety.

FIELD OF THE INVENTION

The invention relates generally to a method and system for implementing a credit card with multiple rule based authentications.

BACKGROUND OF THE INVENTION

Most credit cards have a single associated authentication method (e.g., personal identification number (PIN), biometric, etc.). The authentication method can be used for carrying out various transactions with a given credit card. A single authentication method, however, poses a high risk when data is compromised because then the whole credit limit of the card is exposed. Oftentimes, when a user's PIN/credential are compromised, the card is then used in a far-away city or country to carry out malicious/fraudulent transactions. By the time user is aware of the fraud, a large amount of spend has been made on the credit card.

These and other drawbacks currently exist.

SUMMARY OF THE INVENTION

According to one embodiment, the invention relates to a system for implementing rules based authentication. The system comprises: a memory component that stores one or more user authentication rules; and an authentication rule selection engine comprising a computer processor, coupled to the memory component, the computer processor programmed to perform the steps of: receiving, via a transaction gateway, a transaction request associated with a payment instrument from a user at a point of sale system; determining, via the computer processor, an authorization mode for the transaction request based on one or more transaction attributes; executing, via the computer processor, an authentication rule for the transaction request; transmitting, via a communication network, an authentication request via the authorization mode based on the authentication rule; requiring an authorization input from the user responsive to the authentication request; and upon receiving a proper authentication input, verifying the user and proceeding with the transaction request.

According to another embodiment, the invention relates to a method for implementing rules based authentication. The method comprises the steps of: receiving, via a transaction gateway, a transaction request associated with a payment instrument from a user at a point of sale system; determining, via a computer processor, an authorization mode for the transaction request based on one or more transaction attributes; executing, via the computer processor, an authentication rule for the transaction request; transmitting, via a communication network, an authentication request via the authorization mode based on the authentication rule; requiring an authorization input from the user responsive to the authentication request; and upon receiving a proper authentication input, verifying the user and proceeding with the transaction request.

A method and system of an embodiment of the present invention may be conducted and implemented on a specially programmed computer system comprising one or more computer processors, mobile devices, electronic storage devices, and networks.

The computer implemented system, method and medium described herein can provide the advantages of addressing and reducing fraud exposure. The various embodiments of the present invention may achieve benefits and advantages for customers as well as card issuers. The innovative methodology allows banks and financial institutions to significantly reduce fraudulent usage of credit cards. For customers, the innovative methodology provides flexibility to segregate different usage of cards with different authentication methods to reduce the risk and exposure. With increased protection against fraud and improved safety, financial institutions are able to retain existing customers and attract new ones. With digital wallets, intelligence may be built within the wallet itself to trigger the location specific rules. The innovative method and system provides convenience, time efficiencies, and security for customers as they make various transactions. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
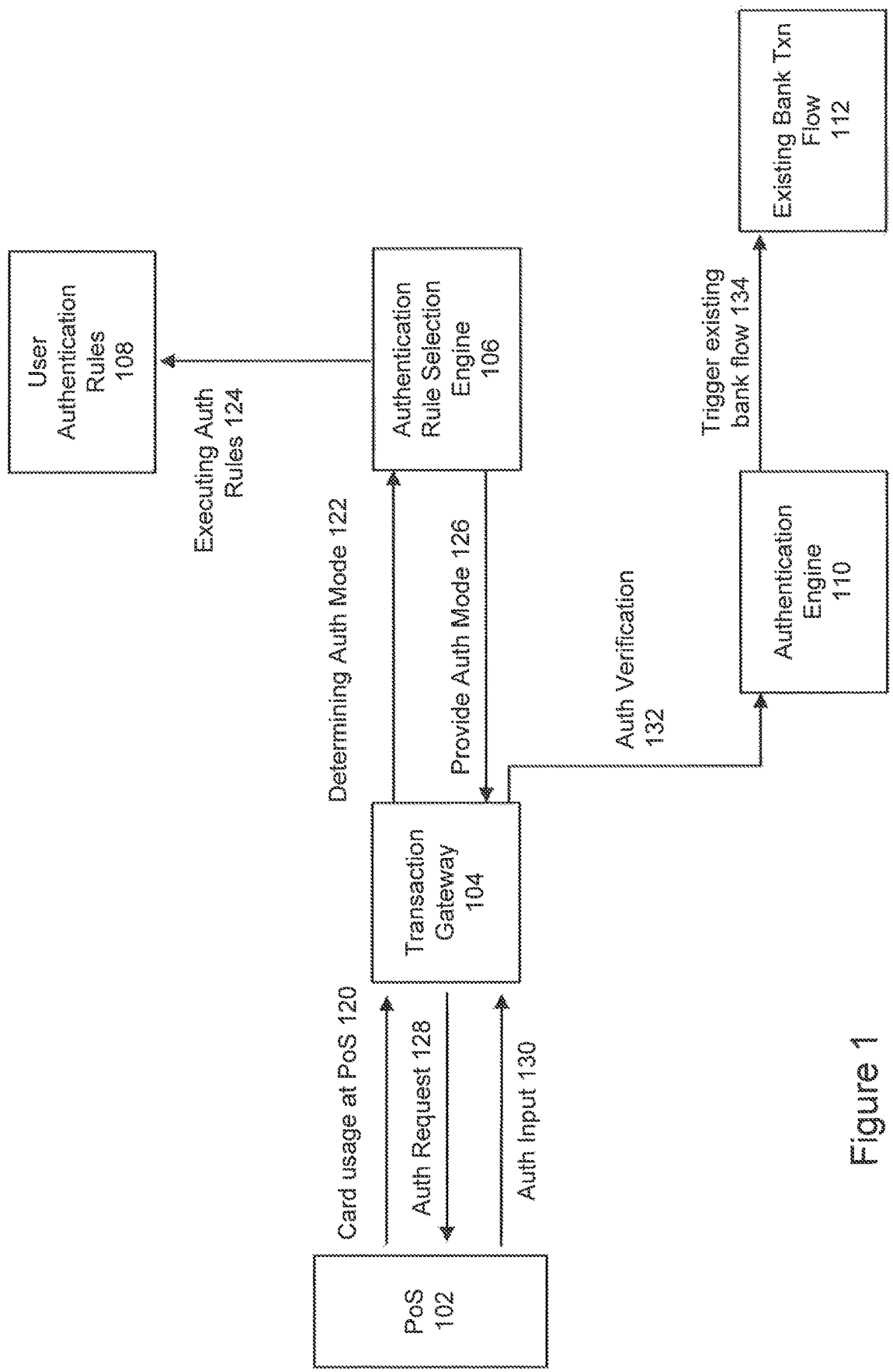
FIG. 1 is an exemplary diagram of a system that provides multiple rules based authentication, according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to associating different authentication modes based on transaction factors, such as location, amount, merchant, etc. Authentication modes may include PIN, one-time password, biometric, fingerprint, voice recognition, etc. For example, a user may apply a 4 digit PIN for local everyday transactions within a predetermined spend limit, e.g., $100.00. If a user makes a transaction using the card outside of a geographic area (e.g., home city, radius, etc.), a specific authentication mode and/or credentials may be applied. Similarly, a different authentication mode and/or credentials may be activated for other transactions having varying characteristics (e.g., high dollar amount, etc.). The characteristics may include where the transaction occurred (e.g., executed outside home city, home country, etc.), transaction amount (e.g., less than $X amount, more than $X amount, etc.), type of transaction (e.g., online, offline), merchant, merchant type, type of transaction, whitelist/blacklist portals, etc. Other characteristics may include external data, external events, third party data, peer data, etc. For example, an authentication mode may be affected by external events, e.g., blackout, high threat activity, data breach, etc. In response, an embodiment of the present invention may adjust authentication requirements. Also, an embodiment of the present invention may consider similarly situated customers or peer customers affected by fraud, e.g., a family member may experience fraud, another customer experiences fraud at a common merchant, store, location, etc.

An embodiment of the present invention is directed to allowing the user to create different authentication profiles and associating the profiles to different use-cases for a given card. An embodiment of the present invention may also learn a user's spending habits and patterns and further suggest profiles and corresponding authentication modes. The suggestions may consider backend risk factors and other considerations. An embodiment of the present invention may rely on artificial intelligence, machine learning and neural networks to analyze user spending habits and patterns and provide a self-learning feature. For example, an embodiment of the present invention may learn a customer's spending habits and suggest or adjust authentication rules based on the customer's activity and behavior as well as fraud, risk and business considerations.

An embodiment of the present invention further enhances security of credit cards by associating a different set of authentication modes for a specific set of transactions. Therefore, even if a fraudster gains access to one set of credentials, it will be difficult for the fraudster to identify all the various transaction rules and settings. Once a credential is used for a wrong category and/or rule, the user will be informed about the attempt. This may occur via a phone communication or through other modes of communication, e.g., short message service (SMS), interactive voice response (IVR), email, etc. When the user is alerted, the user may be presented with an option to change the respective authentication instantaneously. For example, the user may change a corresponding PIN and apply an additional authentication mode, such as a biometric input, etc.

An embodiment of the present invention may authenticate customer communications. For example, a user may request communications from a financial institution via a personal email address. If the user receives a text communication purportedly from the financial institution, that may be an instance of fraud. Accordingly, an embodiment of the present invention may apply authentication rules to communications.

According to an exemplary scenario, an embodiment of the present invention may apply a hierarchy of authentication modes. For example, if a PIN is entered incorrectly, an embodiment of the present invention may request a biometric authentication. This may address the scenario where a user inadvertently enters an incorrect PIN (as a typo). Moreover, if a fraudster is attempting to access a user's credit card, requesting a biometric authentication will deter the fraudster even if the user's PIN has been compromised.

From a bank perspective, each credit card may support multiple credentials (e.g., biometric, PIN based, IRIS scanning, face recognition, etc.) along with the user specified category and/or rule. Whenever a transaction is carried out on a given credit card, the bank may use various transaction attributes to determine which credentials should be used to validate. These transaction attributes may be available with the bank or other entity.

An embodiment of the present invention may apply additional authentications for transactions that have a higher level of associated risk. For example, a user may make a $50 transaction at a merchant. In this example, because the transaction is below a threshold limit, an embodiment of the present invention may require a PIN for authentication. However, the system may determine that the merchant has a high level of risk or fraud. The system may then request an additional authentication mode that is more secure to better safeguard the user.

Current methods simply classify a suspicious purchase as fraud and then decline all subsequent purchases. The customer may then be required to use a different form of payment. Oftentimes, the card is suspended until a customer is contacted to verify the suspicious purchase, which may or may not occur in a timely manner. An embodiment of the present invention may give the customer the opportunity to verify the purchase and then proceed to make subsequent purchases without disruption or inconvenience. For example, rather than declining all subsequent purchases, an embodiment of the present invention may engage the customer to provide additional authentication (e.g., biometrics, etc.) to continue with the transaction.

According to another example, if a user is making an online transaction in a risky environment, additional authentication measures may be applied. For example, this may occur when the user is making an online transaction using public WiFi or other less secure network. Other examples may include a high purchase at a new merchant or unfamiliar location. Other safeguards and security enhancements may be applied.

An embodiment of the present invention may also be implemented with digital wallets which may detect user location and further trigger the location specific rules (e.g., separate PIN, max limit, type of transactions, etc.).

For a certain category of transactions, a user may define face recognition as an authentication method while another user may use PIN based authentication. The user may specify these rules through an interactive interface. The interface may be provided by a bank or financial institution.

According to an exemplary scenario, a user may reside in NY and use a credit card from a financial institution. The user may create a default PIN 1234 of choice for executing any transaction. The user may also decide to create a separate authentication mode for higher value transactions. In this example, the user may set an iris scan as an authentication mode for any transaction above $500. The user may also decide to use face recognition as authentication for transactions outside NY and yet another PIN 3468XX to be used for any transactions outside the country. Other authentications may include biometrics, security questions, location verification, etc. Under this scenario, while making an online transaction for $20 with a vendor portal from a different county, the user's PIN gets compromised. This means the risk exposure for the user is now only $500. If a fraudster tries to use the compromised card and PIN for any transaction with an amount higher than the limit specified by the user, the transaction will be denied and the user will be notified. Also, the compromised password can only be used in NY.

FIG. 1 is a diagram of a system that provides multiple rules based authentication, according to an exemplary embodiment of the invention.

Point-of-sale (POS) system 102 represents where the user may use the card at the time of sale. The POS may represent online or offline transactions.

Transaction Gateway 104 may intercept credit card transactions for authorization. It may decide to route the transaction request to Authentication Rule Selection Engine 106 or Authentication Engine 110. Once the user uses the card for the payment, a first request may be routed to Authentication Rule Selection Engine 106 to determine which appropriate authentication request needs to be applied. Once the user provides the input based on the specific authentication method (e.g., PIN, IRIS scan, fingerprint, voice recognition, etc.), the request may be routed to Authentication Engine 110.

Authentication Rule Selection Engine 106 may determine an appropriate authentication for a given transaction. Authentication Rule Selection Engine 106 may use the transaction attributes to find an applicable rule and an associated authentication mode. For example, if the transaction amount is greater than $500, an embodiment of the present invention may request a user's fingerprint or 6 digit PIN.

User Authentication Rules 108 may store user specified authentication rules with corresponding authentication modes. This may allow the user to specify different rules for the transactions.

Authentication Engine 110 may be responsible for an actual authentication of the user based on the specified mode. Authentication Engine 110 may post a successful authentication of the user. The transaction may be processed through an existing transaction processing flow of the bank.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

At step 120, a user may present a card for a transaction at a PoS. The card may include a credit card, debit card, loyalty card, token and/or other payment instruction. The PoS may represent an in person transaction as well as online or other electronic payment. At step 122, Transaction Gateway 104 may determine a corresponding authentication mode. At step 124, authentication rule may be executed. At step 126, an appropriate authentication mode may be provided to Transaction Gateway 104. At step 128, Transaction Gateway 104 may provide an Authentication request. At step 130, an Authentication input may be received by Transaction Gateway 104. At step 132, authentication verification may be applied. At step 134, Authentication Engine 110 may trigger a bank flow to complete the transaction.

Figure 2:
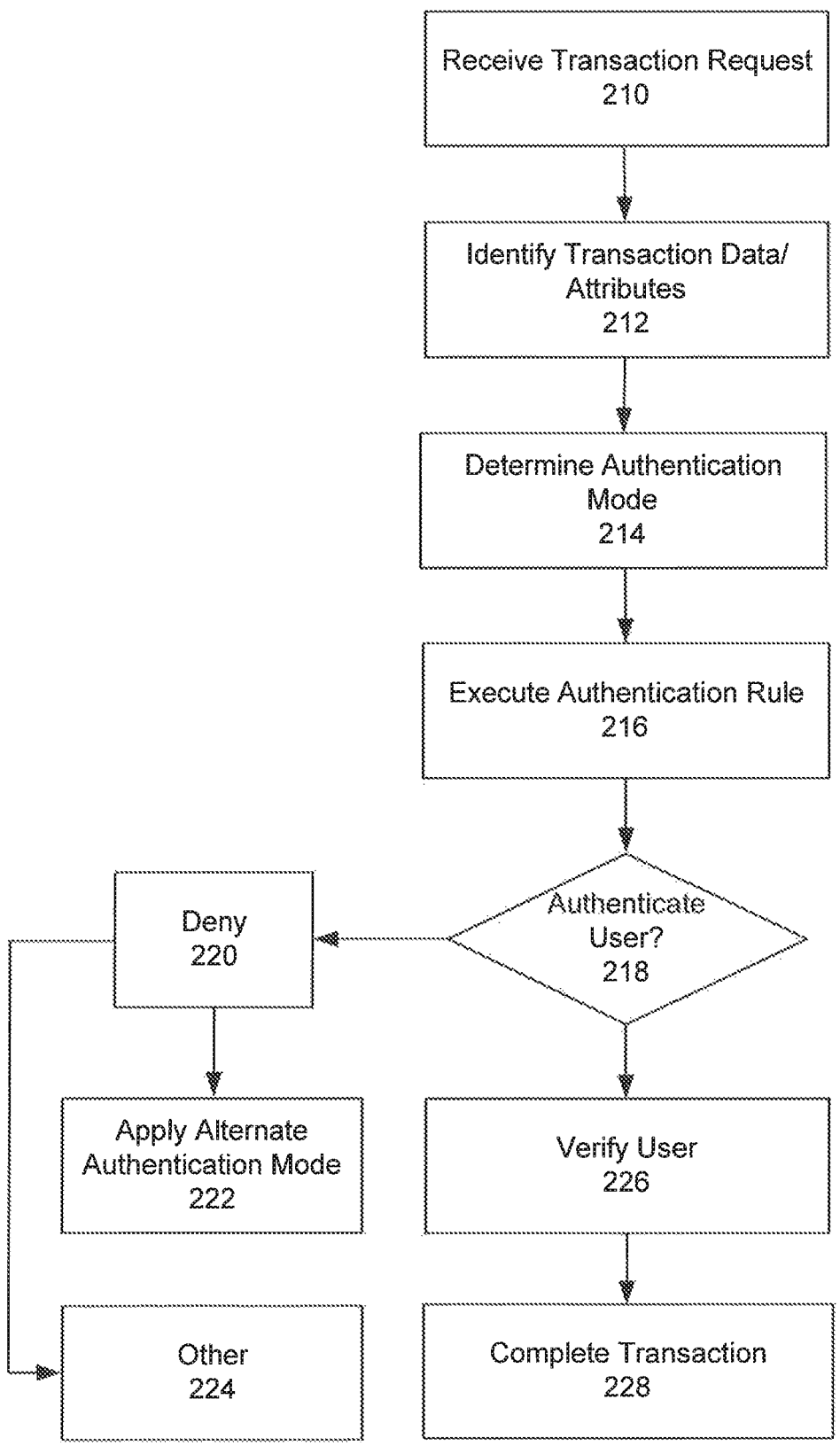
FIG. 2 is an exemplary flowchart for implementing multiple rules based authentication, according to an exemplary embodiment of the invention.

FIG. 2 is an exemplary flowchart for implementing multiple rules based authentication, according to an exemplary embodiment of the invention. At step 210, a transaction request may be received. At step 212, transaction data may be identified. At step 214, authentication mode may be determined based on the transaction data. At step 216, an authentication rule may be executed. At step 218, a user may be authenticated. If the user is not authentication, the transaction may be denied at 220, an alternative authentication mode may be applied at 222 or other action may be performed at step 224. If the user is authenticated, the user may be verified at 226. The transaction may be completed at 228. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Each step is described in more detail below.

At step 210, a transaction request may be received. The transaction request may be from various purchase interactions, including a point of sale interaction, in person purchase, merchant location, online transaction, mobile interaction, etc.

At step 212, transaction data may be identified. Transaction data and attributes associated with the transaction request may be identified. Transaction data and attributes may include type of transaction, merchant, location, amount of purchase, etc. Other transaction data from other sources may also be considered, e.g., data breach, known fraudulent activity, etc.

At step 214, authentication mode may be determined based on the transaction data. The authentication mode may be determined based on risk.

At step 216, an authentication rule may be executed. The authentication rule may be applied to a single transaction as well as a class or category of transactions.

At step 218, a user may be authenticated. Authentication of the user may include transmitting an authentication request to the user and then analyzing the authentication input from the user.

If the user is not authentication, the transaction may be denied at 220, an alternative authentication mode may be applied at 222 or other action may be performed at step 224. If the authentication input from the user is incorrect, the transaction may be denied. According to another scenario, an embodiment of the present invention may apply an alternative or subsequent authentication request.

If the user is authenticated, the user may be verified at 226. The transaction may continue under an existing process. The transaction may be completed at 228.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the system may include a number of servers and user communication devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

Data and information maintained by the servers may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, a set of instructions is used in the processing of various embodiments of the invention. FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing a hierarchy of rule-based security authentication modes, the system comprising:
   a memory component that stores one or more user authentication profiles; and
   an authentication rule selection engine including a computer processor, coupled to the memory component, the computer processor programmed to perform operations, including
   receiving from a user, via the computer processor, a selection of a plurality of authentication profiles, the authentication profiles, including one or more security authentication modes based on one or more attributes for a potential user transaction request;

utilizing artificial intelligence, machine learning and neural networks, via the computer processor, to learn the user's habits and patterns;

providing, via the computer processor, feedback to the user, including one or more suggestions to update the user selection of the plurality of authentication profiles based on the learned user's habits and patterns;

receiving, via a transaction gateway, a transaction request associated with an instrument from the user at a transaction initiation system;

determining, via the computer processor, a plurality of transaction attributes for the transaction request including a transaction location, a transaction recipient, a transaction type, a transaction amount, and a wifi network for the transaction request;

determining, via the computer processor, a proper security authorization mode for the transaction request based on the plurality of one or more transaction attributes;

executing, via the computer processor, an authentication rule for the transaction request;

transmitting, via a communication network, an authentication request to the user;

requiring, via a user-selected security authorization mode, an authorization input from the user responsive to the authentication request;

upon receiving a correct authentication input via an improper security authorization mode:
   automatically informing the user of the correct authentication input via one or more modes of electronic communication;
   transmitting, to an electronic communication account of the user, a presentation of an option to reset the correct authentication input;
   activating an additional security authentication mode requiring biometric input information; and
   applying an additional authentication request;

upon receiving the correct authentication input via the proper security authorization mode, verifying the user and proceeding with the transaction request; and upon receiving an improper authentication input:
   automatically informing the user of the improper authentication input via the one or more modes of electronic communication;
   activating the additional security authentication mode requiring the biometric input information; and
   applying the additional authentication request.

2. The system of claim 1, wherein the transaction initiation system comprises an in-person transaction.

3. The system of claim 1, wherein the transaction initiation system comprises an online transaction.

4. The system of claim 1, wherein the authorization rule comprises location data and transaction amount data.

5. The system of claim 1, wherein the authorization rule comprises external third-party data relating to at least one deceitful event.

6. The system of claim 1, wherein the authentication request comprises a biometric request.

7. The system of claim 1, wherein a plurality of authentication rules is associated with each user.

8. The system of claim 1, wherein the proper security authentication mode is determined based at least in part on artificial intelligence.

9. The system of claim 1, wherein the instrument comprises a card product.

10. A method for implementing a hierarchy of rule-based security authentication modes, the method comprising:

receiving from a user, via a computer processor, a selection of a plurality of authentication profiles, the authentication profiles including one or more security authentication modes based on one or more attributes for a potential user transaction request;

utilizing artificial intelligence, machine learning and neural networks, via the computer processor, to learn the user's habits and patterns;

providing, via the computer processor, feedback to the user, including one of more suggestions to update the user selection of the plurality of authentication profiles based on the learned user's habits and patterns;

receiving, via a transaction gateway, a transaction request associated with an instrument from the user at a transaction initiation system;

determining, via the computer processor, a plurality of transaction attributes for the transaction request, including a transaction location, a transaction recipient, a transaction type, a transaction amount, and a wifi network for the transaction request;

determining, via the computer processor, a proper security authorization mode for the transaction request based on the plurality of transaction attributes;

executing, via the computer processor, an authentication rule for the transaction request;

transmitting, via a communication network, an authentication request to the user;

requiring, via a user-selected security authorization mode, an authorization input from the user responsive to the authentication request;

upon receiving a correct authentication input via an improper security authorization mode:
   automatically informing the user of the correct authentication input via one or more modes of electronic communication;
   transmitting, to an electronic communication account of the user, a presentation of an option to reset the correct authentication input;
   activating an additional security authentication mode requiring biometric input information; and
   applying an additional authentication request;

upon receiving the correct authentication input via the proper security authorization mode, verifying the user and proceeding with the transaction request; and upon receiving an improper authentication input:
   automatically informing the user of the improper authentication input via the one or more modes of electronic communication;
   activating the additional security authentication mode requiring the biometric input information; and
   applying the additional authentication request.

11. The method of claim 10, wherein the transaction initiation system comprises an in-person transaction.

12. The method of claim 10, wherein the transaction initiation system comprises an online transaction.

13. The method of claim 10, wherein the authorization rule comprises location data and transaction amount data.

14. The method of claim 10, wherein the authorization rule comprises external third-party data relating to at least one deceitful event.

15. The method of claim 10, wherein the authentication request comprises a biometric request.

16. The method of claim 10, wherein a plurality of authentication rules is associated with each user.

17. The method of claim 10, wherein the proper security authentication mode is determined based at least in part on artificial intelligence.

18. The method of claim 10, wherein the instrument comprises a card product.

19. The system of claim 1, wherein the verifying the user comprises applying a verification of the authentication.

20. The method of claim 10, wherein the verifying the user comprises applying a verification of the authentication.

* * * * *